United States Patent
Wirstiuk

(10) Patent No.: US 7,610,063 B2
(45) Date of Patent: Oct. 27, 2009

(54) SYSTEM FOR DETERMINING INFORMATION FOR CIRCUIT PACKS CONNECTED BY A SINGLE LINE BUS

(75) Inventor: Boris Roman Wirstiuk, Hackettstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 707 days.

(21) Appl. No.: 10/434,160

(22) Filed: May 9, 2003

(65) Prior Publication Data
US 2004/0224724 A1 Nov. 11, 2004

(51) Int. Cl.
*G06F 17/60* (2006.01)

(52) U.S. Cl. .......................... 455/561; 455/560; 710/4; 710/9; 710/301

(58) Field of Classification Search .............. 455/560, 455/561, 550.1, 557, 418–419, 423, 424; 370/328, 466; 710/8–10, 2–3, 300, 301, 710/4; 340/825.25, 825.21; 711/2, 202, 711/211
See application file for complete search history.

(56) References Cited

U.S. PATENT DOCUMENTS

| | | | | |
|---|---|---|---|---|
| 4,456,790 A * | 6/1984 | Soyack | .................. | 379/102.01 |
| 5,059,836 A * | 10/1991 | Lee et al. | .................... | 327/557 |
| 5,084,869 A * | 1/1992 | Russell | ........................ | 370/329 |
| 5,177,737 A * | 1/1993 | Daudelin et al. | ............ | 370/364 |
| 5,455,959 A * | 10/1995 | Simmering | .................. | 710/18 |
| 5,504,671 A * | 4/1996 | Vasanoja | ..................... | 700/11 |
| 5,974,475 A * | 10/1999 | Day et al. | ..................... | 710/9 |
| 6,044,411 A * | 3/2000 | Berglund et al. | ................ | 710/9 |
| 6,154,728 A * | 11/2000 | Sattar et al. | ................... | 705/28 |
| 6,246,699 B1 * | 6/2001 | Wartski et al. | ............. | 370/498 |
| 6,301,709 B1 * | 10/2001 | Warmink | ....................... | 713/1 |
| 6,363,437 B1 * | 3/2002 | Ptasinski et al. | .............. | 710/10 |
| 6,438,625 B1 * | 8/2002 | Olson | ........................... | 710/9 |
| 6,493,777 B1 * | 12/2002 | Eby et al. | .................... | 710/110 |
| 6,522,648 B1 * | 2/2003 | Heering et al. | ............. | 370/363 |
| 6,628,776 B1 * | 9/2003 | Lee | ............................. | 379/225 |
| 6,745,270 B1 * | 6/2004 | Barenys et al. | ............ | 710/104 |
| 6,851,001 B1 * | 2/2005 | Oudet | ........................ | 710/104 |
| 6,892,256 B1 * | 5/2005 | Krishnankutty | ............ | 710/104 |
| 7,006,040 B2 * | 2/2006 | Henderson et al. | ......... | 342/372 |
| 7,119,708 B2 * | 10/2006 | Newell | .................. | 340/825.52 |
| 2002/0098869 A1 * | 7/2002 | Struhsaker et al. | ......... | 455/561 |
| 2002/0181457 A1 * | 12/2002 | Mezeul et al. | ............. | 370/389 |
| 2003/0154312 A1 * | 8/2003 | Berglund et al. | ........... | 709/250 |

\* cited by examiner

*Primary Examiner*—George Eng
*Assistant Examiner*—Brandon J Miller
(74) *Attorney, Agent, or Firm*—Harness, Dickey & Pierce, P.L.C.

(57) ABSTRACT

A system for determining slot specific information in a base station includes a switch provided in connection with each circuit pack in slots of the base station. The switches are selectively operated to isolate a particular circuit pack to associate the information relating to that circuit pack in a specific slot in the base station.

19 Claims, 3 Drawing Sheets

SYSTEM FOR DETERMINING INFORMATION FOR CIRCUIT PACKS CONNECTED BY A SINGLE LINE BUS

FIELD OF THE INVENTION

The present invention relates generally to wireless communication systems.

BACKGROUND OF THE INVENTION

A base transceiver station (BTS) generally includes wireless communication components to establish and complete calls to and from mobile units (e.g., wireless telephones). A typical BTS includes numerous circuit packs that are usually separate circuit boards or cards configured to provide and control wireless communication functionality and operation. These circuit packs are connected to the BTS, and more particularly, are installed within slots of the BTS. Different circuit packs provide different wireless functionality and operation, such as control operations, radio communication functionality, signal conversion or power supply control. Further, more than one of the same type of circuit pack may be provided in connection with a single BTS.

In order for the BTS to properly operate, information (e.g., version information) relating to circuit packs installed in the slots of the BTS must be known or identified and associated with the circuit packs in specific slots. For circuit packs that include a single wire interface and communicate using a single wire or single line bus within the BTS, the slot location of a particular circuit pack is not readily ascertainable and information relating to a circuit pack cannot currently be associated with a specific slot within the BTS (i.e., cannot distinguish between different circuit packs in different slots of the BTS). Thus, it is not possible to determine slot specific information, for example, circuit pack version information for a specific circuit pack in a specific slot in the BTS, which may be needed for proper operation of the BTS (e.g., to locate circuit packs within specific slots to replace because of problems with those circuit packs).

SUMMARY OF THE INVENTION

Various embodiments of the present invention include a system to determine information relating to a circuit pack within a specific slot in a base station transceiver (BTS) and associate the information with that circuit pack by identifying the various circuit packs within slots of the BTS. The system generally includes a plurality of switches configured for selective activation, with each switch selectively isolating a particular circuit pack to communicate with and, for example, associate corresponding circuit pack information (e.g., version information) with the circuit pack in the isolated slot.

Specifically, in one embodiment, a method of the present invention for identifying a circuit pack in a specific slot connected to a single line bus includes identifying an address of the circuit pack in the specific slot based on isolating the circuit pack in the specific slot and responses received over the single line bus from other circuit packs connected to the single line bus. The responses are in response to possible circuit pack addresses sent over the single line bus. The method further may include determining, via the single line bus, an address for each of a plurality of circuit packs connected to the single line bus and isolating the circuit pack in the specific slot. The address of the circuit pack in the specific slot may be identified based on the determined addresses, isolating of the circuit pack in the specific slot and the responses received over the single line bus from the other circuit packs connected to the single line bus. The method also may include obtaining information on the circuit pack in the specific slot using the identified address and associating the obtained information with the specific slot.

In another embodiment, a circuit pack isolation system of the present invention includes a single line bus and a plurality of switches, with each switch associated with a slot for a circuit pack. Each switch also selectively connects a circuit pack in the associated slot to the single line bus. A control circuit pack also may be provided for controlling operation of the switches. Further, a storage device may be provided and associated with each circuit pack.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of the exemplary embodiments is merely exemplary in nature and is in no way intended to limit the invention, its application, or uses. Although the present invention is described in connection with a wireless communication system having specific component parts and particular requirements, it is not so limited, and different or additional component parts and/or requirements may be implemented as part of the invention.

A general description of a base transceiver station (BTS) in connection with which embodiments of the present invention may be implemented will first be provided. A detailed structural description of embodiments of the present invention and their operation will follow.

Figure 1:
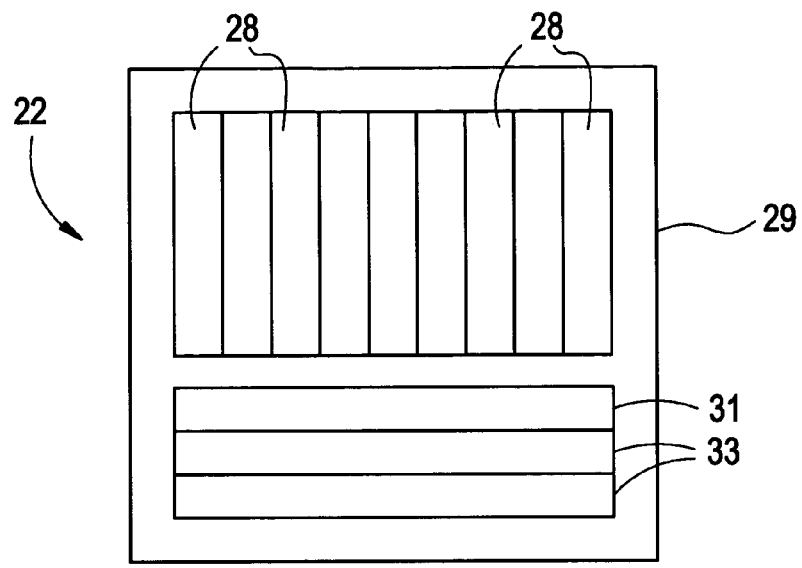
FIG. 1 is a simplified block diagram showing slots within an exemplary BTS for receiving circuit packs.

As shown in FIG. 1, a BTS 22 includes a plurality of slots 28 within a cabinet 29 for receiving circuit packs (e.g., communication packs), typically configured as circuit boards, that provide specific wireless communication functionality. In particular, circuit packs installed within the slots 28 are accessed to establish and maintain wireless communications. Further, additional control and communication components may be included, such as cooling fans (not shown), power feeders 31, circuit breakers 33, etc.

Figure 2:
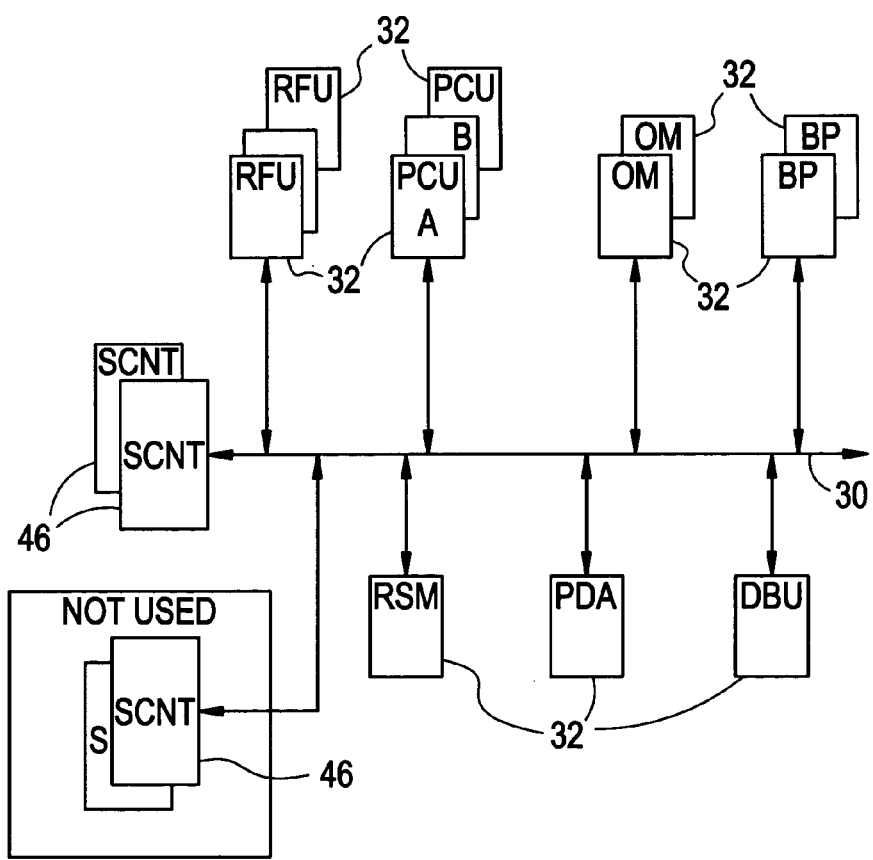
FIG. 2 is a schematic diagram of an exemplary single line bus within a BTS.

More specifically, and as shown in FIG. 2, different circuit packs 32, configured as circuit boards, may be connected to a common, single line bus 30, also referred to as a one-wire bus, such as, for example, a single wire iButton® bus sold by Maxim/Dallas Semiconductor of Dallas, Tex. These circuit packs 32 may include, for example, radio frequency units (RFUs), power conversion units (PCUs), oscillator modules (OMs), backplanes (BPs), debugger units (DBUs), power distribution assemblies (PDAs) and radio frequency switch modules (RSMs). Further, other control circuit packs 32 may be provided, such as one or more control circuit packs (e.g., supervisory controller boards (SCNTs)) 46 that control operation of the various circuit packs 32 (e.g., perform operation, administration and maintenance functions) and include control interfaces for performing these functions (e.g., RS232 ports, ARCNET ports, communication interfaces, etc.). Additionally, one or more of the control circuit packs 46 may provide initial configuration and setup of circuit packs 32 to allow for communication from outside the BTS 22 to the circuit packs 32 within the BTS 22. It also should be noted that additional or different circuit packs 32 may be provided, for example, based upon the particular system requirements, and may include, base-band units (BBUs), clock distribution units (CDUs), fibre interface boards (FIBs), network interface units (NIUs), and call controller boards (CCNT), among others.

The circuit packs 32 may be updated on a periodic basis, for example, to provide additional functionality or to fix a problem with a specific version of particular circuit packs 32. Further, each of the circuit packs 32 may include a single line memory storage device, such as, for example, an iButton® device (not shown) on the single line bus 30. The single line memory device may include information regarding the particular circuit pack 32, such as updated version information and manufacturer information. When the circuit pack 32 is updated, for example by replacing an existing circuit pack 32 with an updated circuit pack 32 (e.g., circuit pack 32 having updated features) or by remotely loading new information into the firmware of the circuit pack 32, at least a portion of this new information must be accessible by the BTS 22 in order for the BTS 22 to properly operate. For example, the new version or revision level (e.g., updated hardware and firmware version information) of the updated circuit pack 32 must be determined by the BTS 22 in order for the BTS 22 to properly operate and communicate with the updated circuit pack 32 connected thereto (e.g., in order to access new features). As another example, this information thereafter may be used to identify circuit packs 32 from a particular manufacturer or of a particular model that have a problem and need to be replaced to ensure continued proper operation of the BTS 22.

Further, this information needs to be associated with a circuit pack 32 in a specific slot 28 within the BTS 22 in order to communicate with and control the particular circuit pack 32 using the information. Associating the information with a circuit pack 32 in a specific slot 28 within a BTS 22 having a single line bus 30 has previously not been possible because there is no way to determine, and more particularly, distinguish between different circuit packs 32 communicating information on the same single line bus 30.

Figure 3:
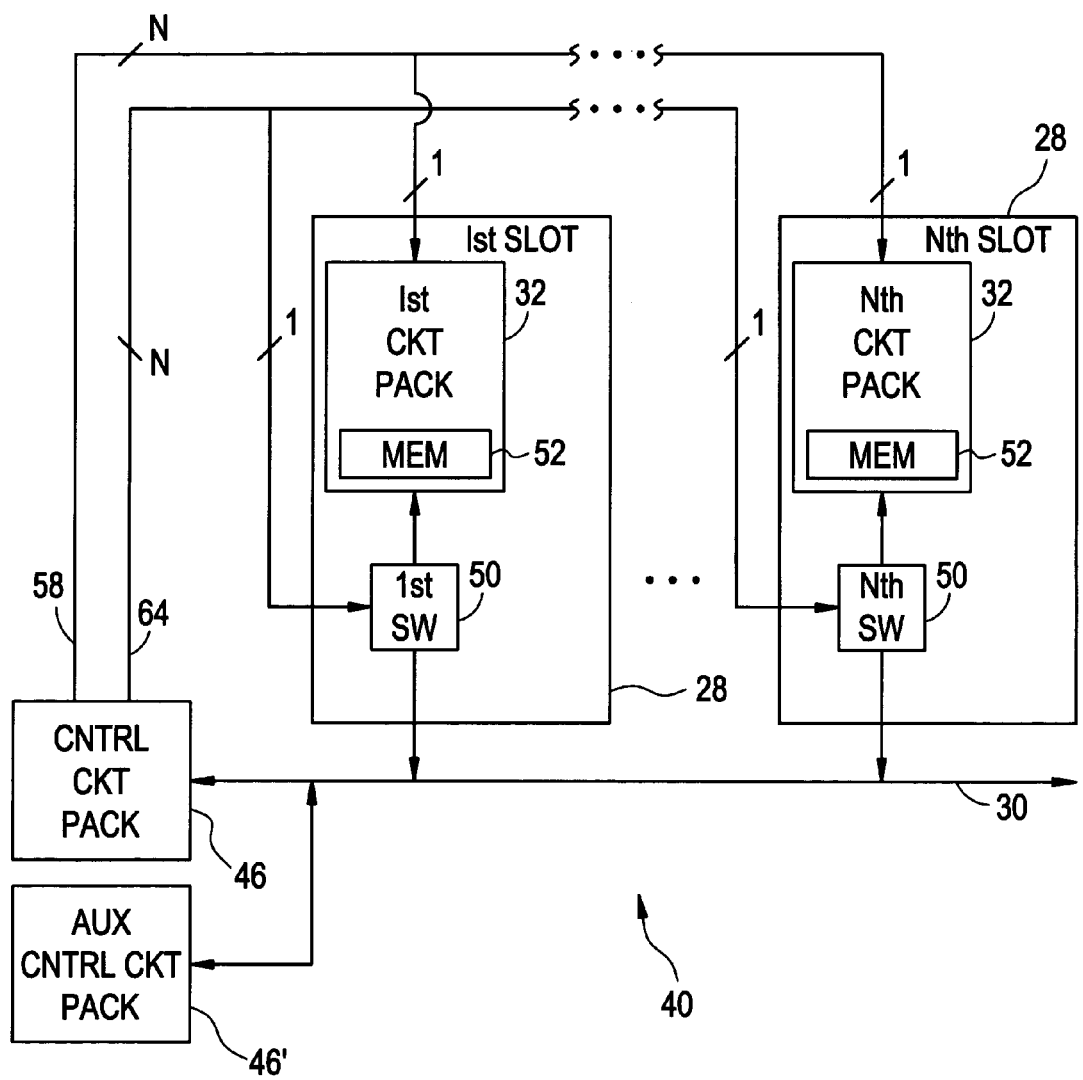
FIG. 3 is a schematic diagram illustrating one embodiment of a circuit pack isolation system according to the present invention.

Having generally described an exemplary BTS 22, embodiments of the present invention will now be described. In general, embodiments of the present invention provide a circuit pack isolation system 40 as shown in FIG. 3 that includes a switch 50 associated with each circuit pack 32 to selectively isolate a circuit pack 32 from the single line bus 30. As will be described in greater detail below, by being able to isolate the circuit packs 32, a control circuit pack 46 (e.g., a SCNT) may identify the specific slot 28 containing a circuit pack 32. Thereafter, information (hereinafter "slot specific information") relating to the circuit pack 32 (e.g., version information, etc.) within the identified isolated slot 28 may be determined by the control circuit pack 46 and associated with the circuit pack 32 and the specific slot 28.

In the exemplary embodiment shown in FIG. 3, a separate switch 50 selectively connects each circuit pack 32 to the single line bus 30. A separate switch 50 is provided in connection with each slot 28 such that a first switch 50 is associated with a first slot 28 and an nth switch 50 is associated with an nth slot 28, where n is greater than 1. The switch 50 may be any applicable well known switching device such as an optical switch, which is described in detail below with respect to FIG. 4. Each circuit pack 32 includes a single line memory storage device 52 having information relating to the circuit pack 32 stored therein. While the single line memory storage device 52 has been illustrated as part of the circuit pack 32, the single line memory storage device 52 may be separate from the circuit pack 32. Further, the information stored within the single line memory storage device 52 may include, but is not limited to, a unique address (e.g., identification number) for the single line memory storage device 52, which may serve as the address for the circuit pack 32 to which it is connected, the manufacturer and location of manufacture of the circuit pack 32, the version of the circuit pack 32 and information relating to features provided as part of the circuit pack 32.

The control circuit pack 46 is connected to each of the switches 50 via enable lines 64, with a separate enable line 64 connected to each of the switches 50. The control circuit pack 46 selectively connects each circuit pack 32 to the single line bus 30 by sending enable signals over the enable lines 64 to the switches 50. A switch 50 is activated upon receiving the enable signal over the enable line 64. For example, upon receiving the enable signal, the switch 50 may turn power on or off to the circuit pack 32. The control circuit pack 46 is also connected to each of the circuit packs 32 via programming lines 58 (e.g., iButton® programming lines), with a separate programming line 58 connected to each of the circuit packs 32. The control circuit pack 46 programs and communicates with the circuit packs 32 using the programming lines 58 as described in more detail below.

Figure 4:
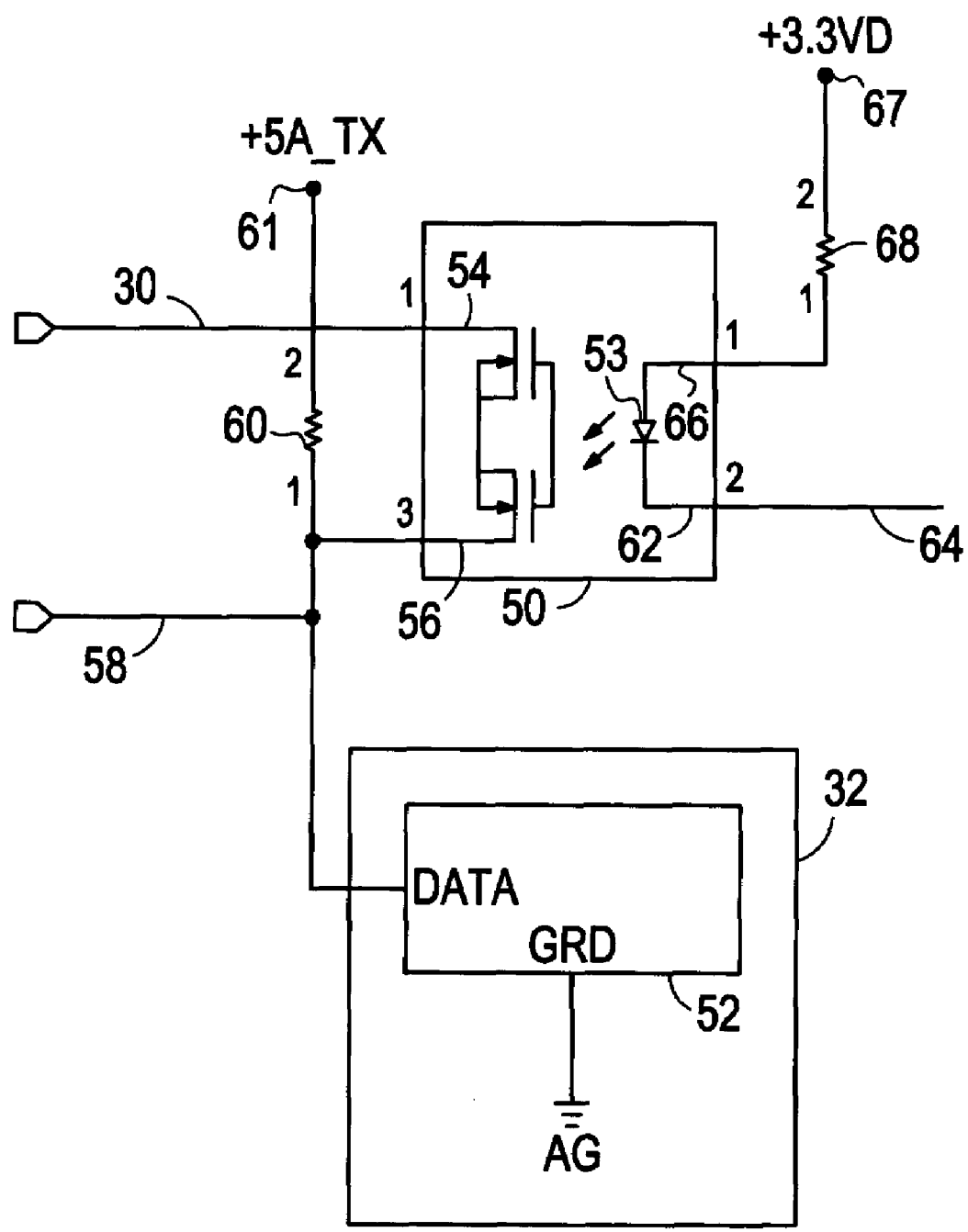
FIG. 4 is a schematic diagram illustrating one embodiment of a connection arrangement for a switch in the system of FIG. 3

FIG. 4 illustrates one exemplary embodiment of an optical switch serving as switch 50. As shown, a first terminal 54 of the switch 50 is connected to the single line bus 30. A second terminal 56 of the switch 50 is connected with the single line memory storage device 52, the programming line 58 and a resistor 60. The resistor 60 is also connected to a first power source 61, for example a five volt power source. The first power source 61 powers the single line memory storage device 52 for operation and to maintain its memory. A third terminal 62 of the switch 50 is connected to the enable line 64. The switch 50 is powered through a fourth terminal 66, which is connected to a second power source 67 (e.g., 3.3 volt power source) through a resistor 68.

In one embodiment, the following component parts are provided:

Switch 50—NAiS brand opto-isolated RF C×R 20 Type PhotoMOS relay sold by Matsushita Electric Works, Ltd. of Japan.

Single line memory storage device 52—iButton® device model DS2505 16 k-bit EPROM sold by Maxim/Dallas Semiconductor of Dallas, Tex.

Resistor 60—R722 (100K) resistor, for example, a 100K Dale brand resistor sold by Vishay Intertechnology, Inc.

Resistor 68—R723 (1K) resistor, for example, a 1K Dale brand resistor sold by Vishay Intertechnology, Inc.

It should be noted that the component parts are merely exemplary of one embodiment of the present invention, and different or additional component parts may be implemented as desired or needed, for example, based upon system requirements.

Next, the operation of the present invention will be described with reference to the embodiment illustrated in FIG. 3. In operation, one or more of the control circuit packs 46 execute a search process to identify the addresses of each single line memory storage device 52 connected to each of the circuit packs 32. In one exemplary embodiment of the search process, the control circuit pack 46 sends an address bit-by-bit over the single line bus 30. If one of the single line memory storage devices 52 recognizes the sent address as matching its address, the single line memory storage device 52 acknowledges receipt of the sent address. The control circuit pack 46 repeats the search process for a set of possible addresses, and thus determines, based on received acknowledgements, the address for each of the single line memory storage devices 52 for circuit packs 32.

It should be noted, for example, that when the single line memory storage devices 52 are iButton® EPROM devices, a search algorithm as described in Application Note 187 available from Dallas Semiconductor and entitled "1-Wire Search Algorithm" may be used.

Next, the control circuit pack 46 determines the specific slot 28 containing each circuit pack 32 using the determined addresses. In one exemplary embodiment, the control circuit pack 46 isolates one of the circuit packs 32 from the single line bus 30. In particular, the control circuit pack 46 activates a first one of the enable lines 64 to enable a first one of the switches 50. The enabled switch 50 then isolates the associated single line memory storage device 52 from the single line bus 30. For example, the switch 50 may power off in response to the received enable signal. This isolates the circuit pack 32 in the first slot 28.

The control circuit pack 46 then executes the search process again or transmits the previously determined addresses for the single line memory storage devices 52. As before, each single line memory device 52 will respond with an acknowledgement when its address appears on the single line bus 30. The address for the single line memory storage device 52 that does not produce a response corresponds to the isolated single line memory device 52. The single line memory storage device 52 and the circuit pack 32 to which it is connected can now be associated with the first slot 28 in the BTS 22.

This isolation process is repeated for each of the second to nth switches 50 associated with the second to nth slots 28. Thus, circuit pack information (e.g., circuit pack version information, etc.) within each single line memory storage device 52 may be associated with a circuit pack 32 and a specific slot 28 of the BTS 22 such that the circuit pack information is treated as slot specific information.

Further, it should be noted that the control circuit pack 46, using the programming line 58, may issue commands (e.g., iButton® commands) to the single line memory storage devices 52 to communicate with the devices. For example, a read command (e.g., Read ROM iButton® command) may be issued and allows for reading a unique address (e.g., eight bit family code, forty-eight bit serial number and eight bit CRC identification number) from the isolated single line memory storage device 52. The control circuit pack 46 can also address a specific single line memory storage device 52 using a match command (e.g., Match ROM iButton® command) followed by the unique address of the single line memory storage device 52 to communicate with that specific single line memory storage device 52 connected to a circuit pack 32. The control circuit pack 46 then can obtain, for example, slot specific information such as information relating to the circuit pack 32 in the slot 28 having the addressed single line memory storage device 52 connected thereto. The control circuit pack 46 also may initiate the search process using a search command (e.g., Search ROM iButton® command) as described herein.

Thus, the present invention provides a system for selectively isolating circuit packs 32 within a BTS 22 to determine and associate information (e.g., version and/or circuit board manufacturer information) relating to the isolated circuit packs 32 in specific slots 28 of the BTS 22. This information may thereafter be used, for example, to identify the version number of circuit packs 32 in specific slots 28 in order to properly communicate with the circuit packs 32 and utilize the specific features of that revision of the circuit pack 32. Further, and for example, the information may be used to later identify problem circuit packs 32 that need to be replaced, such as circuit packs 32 from a particular manufacturer, circuit packs 32 manufactured in a particular location or circuit packs 32 manufactured on a particular date.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for identifying a circuit pack in a specific slot, where the circuit pack is connected to a single wire bus, the method comprising:
    sending a plurality of circuit pack addresses over the single wire bus; and
    identifying an address of the circuit pack in the specific slot based on the circuit pack in the specific slot being isolated and
        responses received over the single wire bus from other circuit packs connected to the single wire bus, the responses being in response to the plurality of circuit pack addresses sent over the single wire bus, wherein the identified address of the circuit pack is one of the sent plurality of circuit pack addresses for which an acknowledgement was not received.

2. The method of claim 1, further comprising:
    determining, via the single wire bus, an address for each of a plurality of circuit packs connected to the single wire bus;
    isolating the circuit pack in the specific slot; and wherein the identifying step identifies the address of the circuit pack in the specific slot based on the determined addresses, the circuit pack in the specific slot being isolated and the responses received over the single wire bus from the other circuit packs connected to the single wire bus.

3. The method of claim 2, wherein the sent plurality of circuit pack addresses are the determined addresses.

4. The method of claim 2, further comprising:
    sending the determined addresses over the single wire bus after the isolating step;
    receiving acknowledgements from the other circuit packs connected to the single wire bus in response to the sending step; and wherein
    the identifying step identifies the address of the circuit pack in the specific slot as the one determined address sent over the single wire bus for which an acknowledgement is not received.

5. The method of claim 4, wherein the receiving step receives the acknowledgements from storage devices associated with the other circuit packs.

6. The method of claim 2, wherein determining step comprises:
    sending a plurality of circuit pack addresses over the single wire bus; and
    determining one of the sent plurality of circuit pack addresses is an address of one of the plurality of circuit packs when a acknowledgement is received in response to the one of the sent plurality of circuit pack addresses.

7. The method of claim 2, wherein the isolating step controls a switch, associated with the specific slot, to effectively disconnect the circuit pack in the specific slot from the single wire bus.

8. The method of claim 2, comprising:
obtaining information on the circuit pack in the specific slot using the identified address; and
associating the obtained information with the specific slot.

9. The method of claim 8, wherein the obtaining step obtains the information on the circuit pack in the specific slot from a storage device associated with the circuit pack in the specific slot.

10. The method of claim 1, comprising:
obtaining information on the circuit pack in the specific slot using the identified address; and
associating the obtained information with the specific slot.

11. The method of claim 10. wherein the obtaining step obtains the information on the circuit pack in the specific slot from a storage device associated with the circuit pack in the specific slot.

12. A circuit pack isolation system, comprising:
a single wire bus;
a plurality of switches, each switch associated with a slot for a circuit pack, each switch for selectively connecting the circuit pack in the associated slot to the single wire bus; and
a control circuit pack configured to send a plurality of circuit pack addresses and to send an enable signal to isolate a first circuit pack in the associated slot from the single wire bus and to identify the first circuit pack having one of the sent plurality of circuit pack addresses in the associated slot based on at least one response received over the single wire bus in response to the sent plurality of circuit pack addresses, wherein the isolated first circuit pack is identified as the circuit pack having the one of the plurality of circuit pack addresses for which an acknowledgement was not received at the control circuit pack in response to the sent plurality of addresses.

13. The system of claim 12, further comprising:
a storage device associated with each circuit pack.

14. The system of claim 13, wherein each storage device stores information regarding the associated circuit pack.

15. The system of claim 14, wherein the information includes at least one of an address of the circuit pack and version information on the circuit pack.

16. The system of claim 12, wherein at least one of the switches is an optically isolated switch.

17. A method for identifying a circuit pack in a specific slot, where the circuit pack is connected to a single wire bus, the method comprising:
sending a first set of circuit pack addresses over a single wire;
receiving first responses to the first set of circuit pack addresses;
determining a plurality of circuit packs inserted into a plurality of slots based on the first received responses;
isolating one of the plurality of slots;
sending a second set of circuit pack addresses over the single wire bus;
receiving second responses to the second set of circuit pack address; and
determining a specific circuit pack is in the isolated one of the plurality of slots based on the second responses.

18. The method of claim 17, wherein the second set of circuit pack addresses includes a circuit pack address of the first set corresponding to each of the plurality of circuit packs.

19. The method of claim 18, wherein the specific circuit pack corresponds to one of the plurality of circuit packs that does not respond to any of the second set of circuit pack addresses.

* * * * *

UNITED STATES PATENT AND TRADEMARK OFFICE
CERTIFICATE OF CORRECTION

PATENT NO.        : 7,610,063 B2                                         Page 1 of 1
APPLICATION NO.   : 10/434160
DATED             : October 27, 2009
INVENTOR(S)       : Boris Roman Wirstiuk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Twelfth Day of October, 2010

David J. Kappos
*Director of the United States Patent and Trademark Office*